US005161416A

United States Patent [19]

Avant et al.

[11] Patent Number: 5,161,416

[45] Date of Patent: Nov. 10, 1992

[54] HANDSET TORQUE MEASUREMENT DEVICE AND METHOD

[75] Inventors: Charles T. Avant, Somerset; Michael A. Feula, Florham Park, both of N.J.

[73] Assignee: Bell Communications Research, Inc., Livingston, N.J.

[21] Appl. No.: 666,335

[22] Filed: Mar. 8, 1991

[51] Int. Cl.$^5$ .................................... G01L 5/24

[52] U.S. Cl. .................................... 73/862.21; 13/862.23

[58] Field of Search .................... 73/862.21, 862.23; 379/1, 457; 81/120, 125

[56] References Cited

U.S. PATENT DOCUMENTS

| | | | |
|---|---|---|---|
| 3,916,939 | 11/1975 | Gillard | 81/125 |
| 4,129,035 | 12/1978 | Ango | 73/862.21 |
| 4,989,459 | 2/1991 | Faber, Jr. | 73/862.23 |

OTHER PUBLICATIONS

Generic Requirements for Public Telephone Handsets, TR-TSY-000452, Issue 1, Bellcore, 10/87.

*Primary Examiner*—Herbert Goldstein
*Assistant Examiner*—Elizabeth L. Shopbell
*Attorney, Agent, or Firm*—Leonard Charles Suchyta; Loria J. Baskerville

[57] ABSTRACT

A torque measurement device is described which facilitates the testing of a handset cap of a public telephone for determining compliance with evolving mechanical disassembly requirements. The device is an interface between the handset cap under test and the torque measurement tool for uniform application of torque to the handset cap and the acquisition of reliable and reproducible test results. The device is a metallic receptacle having in its base a cylindrical aperture which conforms dimensionally to the shape of the handset cap and lodges the handset cap during testing. Also, the device includes set screws which bear against the cap to hold it uniformly in place during testing.

13 Claims, 2 Drawing Sheets

HANDSET TORQUE MEASUREMENT DEVICE AND METHOD

FIELD OF INVENTION

This invention relates to a torque measurement device and method for nondestructively measuring torque that is uniformly applied to a telephone instrument cap for determining whether the cap can withstand a pre-determined torque without separating from the telephone instrument.

BACKGROUND OF THE INVENTION

An overwhelming problem faced by public telephone service providers is theft of transmitters and receivers located in the telephone handset. To combat this problem, service providers have established mechanical disassembly requirements to which public phone manufacturer should conform. These requirements impose that telephone handset caps should not be removable from the telephone handset without destroying the handset. (*Generic Requirements for Public Telephone Handsets*, TR-TSY-000452, Issue 1, Bellcore, 10/87). In order to determine whether a public telephone handset conforms to such a requirement, manufacturers have stressed the telephone handset to failure, which many times have rendered the tested handset unusable regardless of whether it passed or failed the requirements test. Such catastrophic testing has resulted in a higher cost to be borne by the manufacturer and passed on to the public phone service provider. Furthermore, smaller sample sizes were tested in the interest of reducing costs associated with such destructive testing which directly resulted in reduced quality control.

To alleviate the problems and high costs associated with catastrophic testing, service providers are changing their mind set on requirements needed to counter vandalism and theft problems. Requirements are changing to reflect the need for the handset to withstand a maximum torque which a strong human hand could apply to the handset cap in an attempt to remove it. This revised requirement has great potential to significantly reduce costs and improve quality control associated with testing public phone caps; however, suitable equipment to facilitate testing and an associated test method do not exist for determining conformance with evolving requirements.

The lack of such test equipment and method hinders the evolution and implementation of requirements which support non-destructive testing. Under current requirements, test methods typically include the use of a pipe or belt wrench which are not suitable to perform torque tests on handset caps under evolving requirements.

In placing a pipe wrench onto the cap of a public phone handset and applying a torque by attempting to turn the wrench, a number of drawbacks exist that preclude the use of this tool under evolving test requirements. The shape and grip of the pipe wrench does not conform to the shape of the handset cap; therefore, the pipe wrench applies pressure at only two points where the wrench actually makes contact with the cap. As a result, the torque applied is non-uniform and test results are non-reproducible. Furthermore, even applying a torque using the pipe wrench at levels short of destruction is undesirable since deformation and elongation of the cap and handset will result due to the two-point, non-uniform pressure being applied by the pipe wrench.

Although a belt wrench appears to conform geometrically to the cylindrical shape of the handset cap, the tool still proves ineffective since the belt wrench is cylindrical with non-sloping sides and the handset cap has sloping sides; therefore only a small linear area of the belt wrench actually contacts the handset cap, thus resulting in a non-uniform torque being applied to the handset cap. Due to insufficient contact with the handset cap, both the pipe and belt wrenches tend to slip off the cap when torque is being applied, thus presenting a hazard to the user. Furthermore, to date torque measurement instruments are not adaptable to these wrenches such that the torque being applied to the handset cap can be quantified or measured. Even if adaptable measurement instruments existed, pipe and belt wrenches would prove ineffective since the measurements would be non-reproducible given the poor contact between the wrench and the cap and the non-uniform torque applied to the handset cap.

In view of these shortcomings of conventional handset cap test instruments, it is the object of the present invention to provide a device and method which facilitate the uniform application of torque to handset cap and the nondestructively and reproducibly quantification of torque applied to the cap to determine whether the cap can withstand a pre-determined torque without separating from the telephone instrument.

SUMMARY OF THE INVENTION

Our invention can be used to facilitate testing a handset cap of a public telephone to determine compliance with evolving mechanical disassembly test requirements. In the interest of protecting against theft and vandalism of telephone transmitters and receivers accessible beyond the telephone handset cap, evolving requirements indicate that handset caps should withstand a pre-determined minimum level of torque without being removed from the handset. Our invention serves as an interface between a handset cap under test and a torque measurement tool to facilitate uniform application of torque to the handset cap and the acquisition of reliable and reproducible test results.

The device of our invention comprises a metallic receptacle having in its base a cylindrical aperture in which the handset cap under test is to be lodged. The handset cap is securely lodged by multiple set screws which are inserted in holes extending through the side walls of the aperture. The set screws bear against the cap to hold it firmly in place during torque measurements. The screws are uniformly spaced about the circumference of the handset cap and are independently adjustable. Typically, the screws are set at substantially the same torque level such that the torque applied to the handset cap is uniform.

A tool set for determining conformance with evolving disassembly requirements illustratively includes the device of the present invention, equipment for setting and measuring the torque applied by each set screw at an area of the handset cap, a torque tool for torquing and measuring the torque applied to the entire handset cap, and an apparatus for mounting the handset during testing. A method for testing in accordance with our invention includes the steps of placing the handset under test in the mount apparatus, placing the handset cap to be tested inside the device of our invention, setting the set screws of the device to substantially the same pre-determined torque, attaching the torque wrench to the device, and applying force until the torque applied reaches a pre-determined minimum torque level, the cap is removed from the handset, or the handset breaks.

Implementation of this device for testing compliance with evolving mechanical dissembly requirements allows the torque applied to the handset cap to be quantified, thus obviating the need to perform destructive tests in determining compliance with conventional disassembly requirements. Furthermore, the test results yielded from the use of this device are reliable and repeatable.

DETAILED DESCRIPTION

A. Handset Torque Measurement Device

Figure 1:
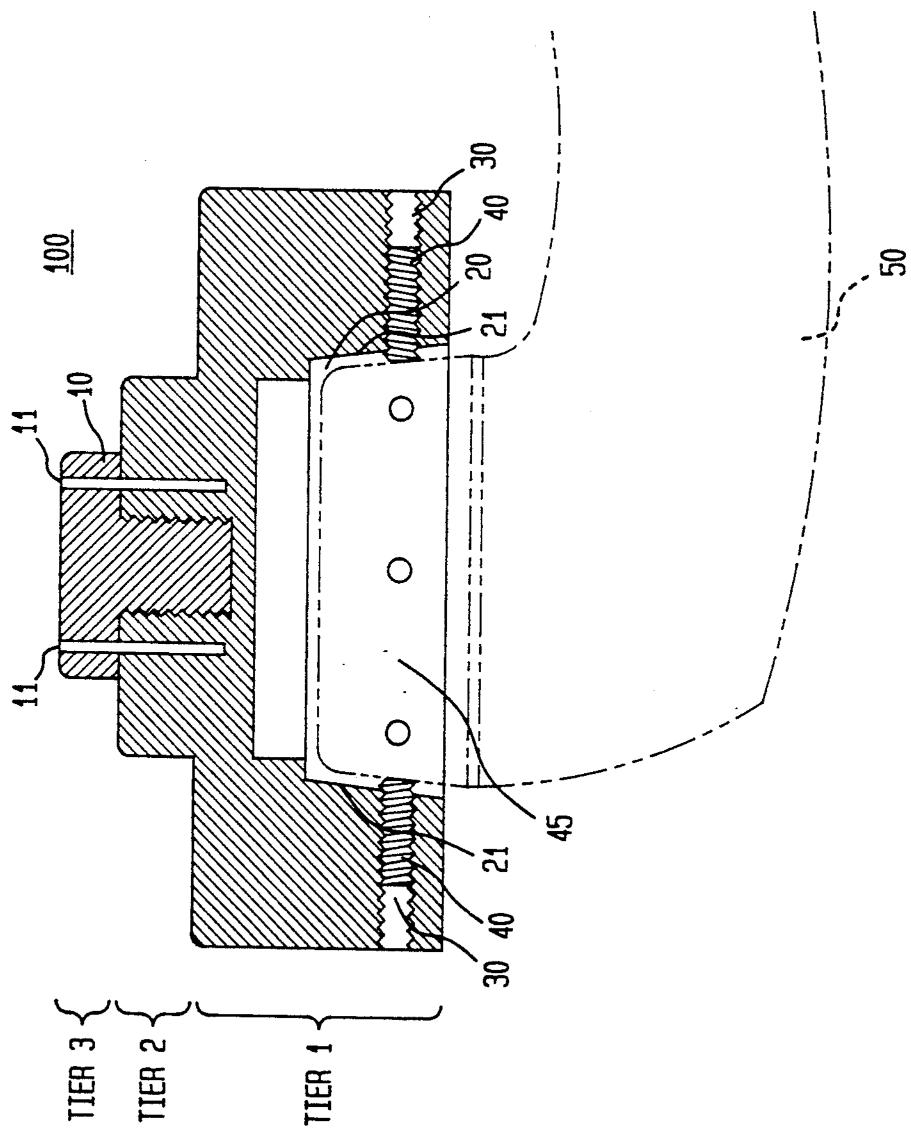
FIG. 1 is a sectional view of a handset torque measurement device with a telephone handset cap under test, shown in phantom, lodged in its base in accordance with an illustrative embodiment of our invention.

In accordance with an aspect of our invention, the handset torque measurement device is used as an interface between the telephone handset cap under test and the torque measurement tool to facilitate the application of uniform torque and measurement of torque applied at the handset cap. FIG. 1 depicts an illustrative embodiment of the handset torque measurement device 100. In a preferred embodiment, the device is a metallic receptacle constructed to withstand the pre-determined level of torque that can be applied by the strongest human hand, which has been quantified to be approximately 115 ft-lbs. In this specific embodiment, the device is cylindrical in shape having a triple tier construction where the first tier 1, being the bottom most tier, has an outer diameter of 4 inches, the second tier 2, being the middle tier, has an outer diameter of 2.1 inches, and the third tier 3, being the top most tier, has an outer diameter of 1 inch. The device may have a unibody construction or the individual tiers may be distinct units; in one specific embodiment, the first tier was aluminum and the second and third tiers were steel. This device comprises a head screw 10, a base aperture 20 described further below, N drill and tap holes 30, and N adjustable set screws 40 insertable into the tap holes 30.

Figure 2:
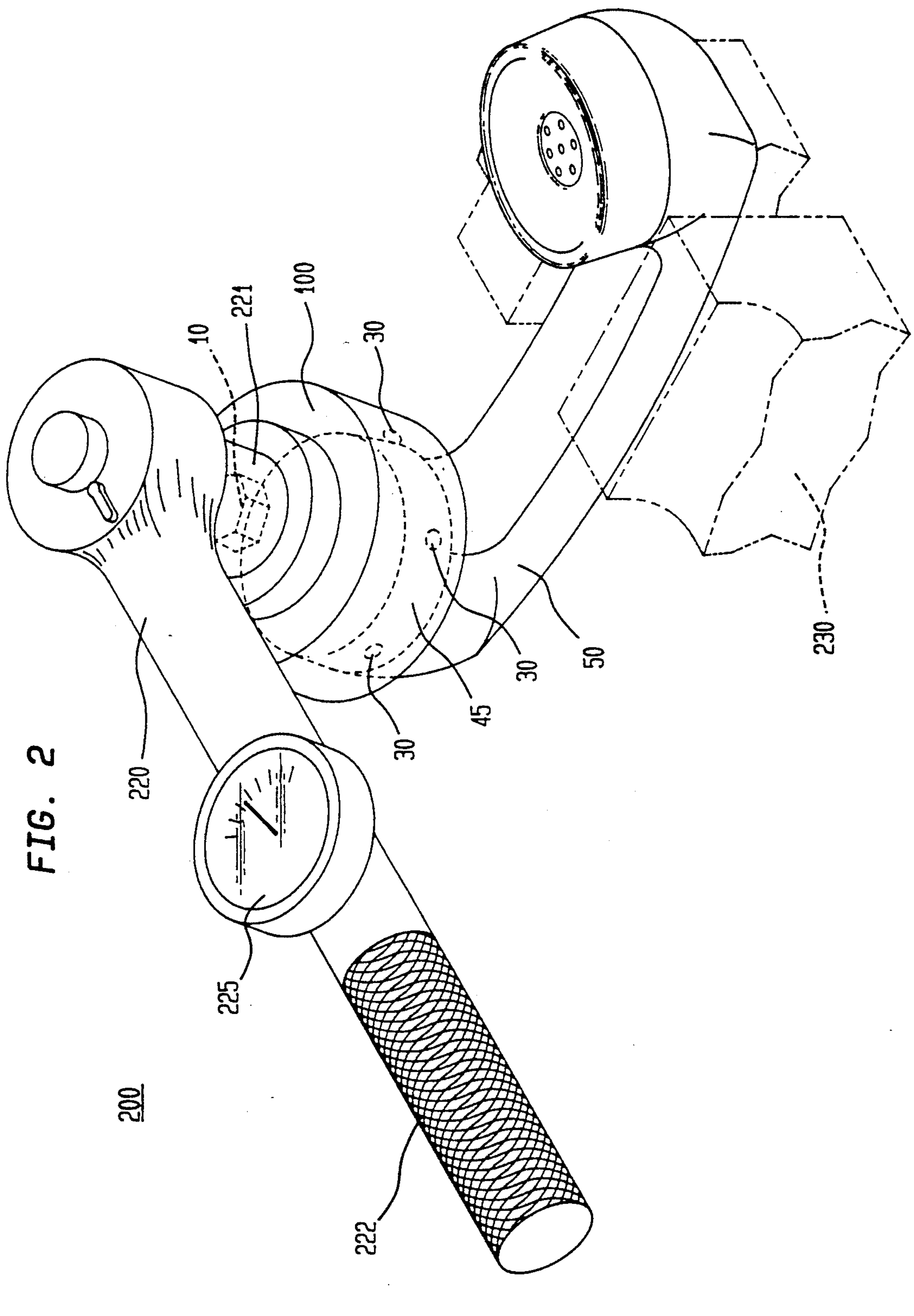
FIG. 2 is a perspective view of a tool set which employs a handset torque measurement device having a telephone handset cap under test lodged in its base, and a torque measurement tool attached to its head for measuring torque applied to the handset cap in accordance with an illustrative embodiment of our invention.

The head screw 10 (tier 3) is located at the top of the device and adapts to the connector 221 of torque measurement tool 220 shown in FIG. 2. As constructed in a preferred embodiment, the head screw 10 is a hexagonal flat head screw which is semipermanently attached to the receptacle via stress pins 11 extending through the head screw and the second and third tiers of the device. The hexagonal head screw 10 dimensionally conforms to the hexagonal shape of the connector 221 of the torque measurement tool 220 and serves as the point at which the torque measurement tool 220 is attached to the device 100 for applying and measuring torque at a handset cap 45 to be tested.

The aperture 20 of the handset measurement device 100 is located at the bottom of the device 100 in tier 1 and conforms dimensionally to the size, shape, and depth of the telephone handset cap 45 as shown in phantom in FIG. 1. The aperture 20 is cylindrically shaped with sloping side walls 21 such that diameter of the aperture 20 becomes smaller proceeding deeper into aperture 20.

In tier 1 of the device 100, N drill and tap holes 30 extend from the exterior side surface of the device 100 to the sloping side walls 21 of the aperture 20. In each hole 30, one of N set screws 40 is inserted. The set screws 40 bear against the handset cap 45 lodged in the aperture 20 and hold the cap 45 in place during torque measurements. In a preferred embodiment, there are 8 drill and tap holes 30, spaced substantially equally around the circumference of the aperture 20 such that the torque applied by the set screws 40 is uniformly distributed on the handset cap 45.

The torque applied by each set screw 40 upon the cap 45 is adjustable; however, in a preferred embodiment the torque applied at each set screw 40 should be substantially the same to further ensure that the torque applied at the handset cap 45 is uniformly distributed. The torque applied at each set screw 40 is determined by that required to hold the handset cap 45 in place during the application of at least 115 ft-lbs torque by the torque measurement tool 220 (FIG. 2). As noted above, 115 ft-lbs has been determined to be the maximum level of torque that can be applied to the handset cap 45 by a vandalistic human hand.

In general, the torque required at each set screw 40 varies with the number of set screws N employed by the device to hold the device in place. The more set screws employed by the device, the less torque that is needed to be applied at each set screw to hold the cap firmly in place. Tests have shown that for $N=8$, a torque applied at each set screw at a level between 15 to 20 in-lbs is optimal. A larger torque at each set screw is functionally desirable since it would provide greater assurance that the cap is steadfastly held in place during torque measurement; however, an extreme torque may result in local deformation of the handset cap where the set screws contact the cap. Therefore, the functional desirability of a larger torque at each set screw must be weighed against the possible deformation that may result.

Uniform distribution of the drill and tap holes about the circumference of the aperture and uniform torque applied by each set screws onto the handset cap result in torque measurements that are reliable and reproducible. Furthermore, given this uniformity, elongation and deformation of the handset cap does not result, contrary to stressing the handset cap using conventional techniques employing pipe and belt wrenches. Furthermore, because the set screws apply uniform torque against the handset cap and hold it firmly in place, use of the device is inherently safe to the user, unlike the use of pipe and belt wrenches which slip off during the application of torque to the handset cap, thus presenting a safety hazard to the user.

B. Torque Measurement Tool Set

In accordance with an aspect of our invention, a tool set 200 shown in FIG. 2 for non-destructively and reproducibly measuring torque applied to a handset cap of a public telephone comprises, in combination, the torque measurement device 100 described in Section A, a set screw adjustment tool and set screw torque measurement tool, not shown, a torque measurement tool 220, and a mounting apparatus or vise 230. The tool set 200 is used to facilitate testing of a telephone handset cap to determine whether the cap can withstand a predetermined torque without separating from the telephone handset onto which the cap is screwed or without damaging the handset.

The torque measurement device 100 serves as an interface between the handset cap 45 under test and the torque measurement tool 220 to facilitate application and measurement of torque at the handset cap 45. The telephone cap is lodged in an aperture 20 in the bottom of the device 100, and each of the set screws 40 uniformly distributed around the aperture 20 applies a uniform force against the surface of the cap 45 to hold the cap firmly in place during testing.

A set screw adjustment tool is applied to the head of the set screws 40 of the device 100 and adjusts the torque applied at each set screw 40 to the handset cap 45 under test. This tool, which may be an allen wrench, is also connected to a set screw torque measurement tool such that the torque applied at each set screw 40 can be measured and set at the same level.

The torque measurement tool 220 connects to the measurement device 100 and applies and measures torque in testing a handset cap 45. After connector 221 of the tool 220 is attached to the head screw 10 of the device 100, the user applies a torque to the handset cap 45 by turning the tool 220 by its handle 222, and the torque applied will be quantified and reported on the torque gauge 225 integrated in the tool 220 as shown in FIG. 2.

During testing, the handset 50 under test is fastened in a mount apparatus or vise 230 as shown in FIG. 2. Preferably, the end of the handset 50 opposite to the cap 45 under test is physically gripped in the mount apparatus 230. Placing the handset 50 in the mount apparatus allows the handset 50 to be sturdy during testing with the cap 45 under test exposed and readily accessible.

C. Method for Testing Handset Cap

Evolving mechanical dissembly requirements for public telephone handset cap impose that the handset cap should withstand a maximum torque that a vandalistic human hand could apply to the handset cap in an attempt to remove it. A method for testing a telephone handset cap to determine whether the cap complies with these evolving requirements involves the use of the torque measurement device 100 of Section A, the tool set described in Section B and the following steps.

Initially, the handset should be placed and securely lodged in a mount 230 as shown in FIG. 2, such that the cap under test in exposed and accessible for testing. The torque measurement device 100 should be placed over the handset cap 45 under test such that the cap is fitted into the aperture 20 in the bottom of the device 100. The set screws 40 of the device 100 should be adjusted using a set screw adjustment tool and set screw torque measurement tool such that the level of torque applied to the cap at each set screw is uniformly set. For a device having 8 set screws, the torque applied by each set screw should be set preferably at 15 in-lbs. After the handset cap 45 is securely lodged in the device 100, the torque measurement tool 220 should be attached to the device 100.

Lastly, the user should apply torque to the handset cap 45 by gripping the handle 222 of the torque measurement tool 220 and applying rotational force in an attempt to turn it until the torque measurement gauge 225 indicates that a torque of preferably 115 ft-lbs has been applied. If the cap is removed from the handset prior to the application of 115 ft-lbs or the required level of torque, then the cap 45 does not comply with evolving requirements, and testing is completed. However, if the applied torque equals or exceeds 115 ft-lbs or the required torque level without the cap 45 being removed from the handset 50 or the handset 50 breaks during testing, the evolving mechanical disassembly test requirements have been met, and testing is completed.

CONCLUSION

Thus, our invention provides a torque measurement device for nondestructively measuring the torque that can be applied without disassembly of public telephone handset caps. This device, by conforming to the shape and dimensions of the handset cap, allows uniform application of torque to the cap, thus yielding reliable and reproducible results, contrary to test instruments employed conventionally which produce highly unreliable results with low repeatability. Lastly, because the cap is firmly held in place by the uniform application of torque by multiple set screws equally spaced about the handset cap, the device inherently resists potential safety hazards to the user. Such hazards are common with the use of conventional test instruments due their tendency to slip off of the cap. In using this device in combination with other tools and apparatus, a method may be employed to test the cap for compliance with evolving dissembly test requirements without destroying the handset during testing.

Numerous alternative embodiments of the present invention may be devised without departure from the spirit and scope of the following claims.

What is claimed is:

1. A device for measuring the torque applied to a transmitter or receiver cap of a telephone handset for determining whether the cap can withstand a pre-determined torque without separating from the telephone handset onto which the cap is screwed, said device comprising:

a metallic receptacle having in its base a cylindrical aperture with sloping interior side walls adapted to receive the telephone handset cap to be tested, said receptacle also having in its sides N holes extending from the exterior of the side surface of said receptacle to the sloping interior side walls surface of said aperture, wherein N is a positive integer, N adjustable set screws, each of said N set screws being inserted in one of said N holes of said receptacle, and having its inner surface bearing upon the cap within said aperture for uniformly applying torque at N points on the cap, and a head screw extending from an upper surface of said receptacle and adapted to be seized by a torque applying and measuring tool.

2. The device of claim 1 wherein said aperture conforms dimensionally to the size and shape of the telephone handset cap to be tested.

3. The device of claim 1 wherein said receptacle is a metallic unibody construction.

4. The device of claim 1 wherein a top portion of said metallic receptacle is steel and a bottom portion of said metallic receptacle is aluminum.

5. The device of claim 1 wherein said head screw is secured to said receptacle with stress pins which extend through said head screw and into said metallic receptacle.

6. The device of claim 1 wherein the torque applied at each of said set screws is substantially the same.

7. The device of claim 6 wherein said N holes are set equal distance apart.

8. The device of claim 7 wherein N is selected such that torque is uniformly distributed about the telephone handset cap lodged in said aperture.

9. The device of claim 8 wherein N equals 8 and wherein said holes are separated by 45 degrees.

10. A tool set for nondestructively and reproducibly measuring torque applied to a transmitter or receiver cap of a telephone handset to determine whether the cap can withstand a pre-determined torque without separating from the telephone handset onto which the cap is screwed or damaging the handset, said tool set comprising in combination:

a device which facilitates application of torque to telephone handset cap, said device comprising:

a metallic receptacle having in its base a cylindrical aperture with sloping interior side walls adapted to receive the telephone handset cap to be tested, said receptacle also having in its sides N holes extending from the exterior of the side surface of said receptacle to the sloping interior side walls surface of said aperture, and N adjustable set screws, each of N said set screws to be inserted in one of N said holes of said receptacle, said screws having their inner surfaces bearing upon the cap within said aperture, for uniformly applying a pre-determined torque level at N points on the telephone handset cap;

means for torquing said device in an attempt to turn said cap lodged in said device against the resistance of said set screws, said torquing means including means for measuring the torque applied, and mounting means for holding said telephone handset under test during torque measurements, wherein N is a positive integer.

11. A method for measuring the torque applied to a transmitter or receiver cap of a telephone handset for determining whether the cap can withstand a pre-determined torque without separating from the telephone handset onto which the cap is screwed, said method comprising:

placing the handset to be tested into a mount which firmly holds the handset, placing the handset cap to be tested inside a device which adapts to the shape of the handset cap and adjusting said device to apply uniform torque against multiple points on the sides of the handset cap, attaching a torque wrench onto said device to apply a uniform torque to the handset cap, and applying force to the torque wrench until the torque applied reaches the level of a pre-determined required torque, the cap is removed from the handset, or the handset breaks.

12. A device for non-destructively testing a telephone handset cap to assure that the cap can withstand a pre-determined torque without separating from the telephone handset, said device comprising a metallic receptacle having in its base a cylindrical aperture with sloping interior side walls adapted to receive the telephone handset cap to be tested, means for holding the cap within said aperture in said receptacle during application of said pre-determined torque, said holding means comprising a plurality of adjustable screws inserted through holes in said sloping interior side walls of said receptacle and having their inner surfaces bearing upon the cap within said aperture for applying equal and uniform forces against the cap, and means for applying a test torque up to at least said pre-determined torque to said receptacle to attempt to turn said cap against the resistance of said adjustable screws, said applying means including means for measuring the test torque applied.

13. A device in accordance with claim 12 wherein said test torque applying means includes a screw mounted on an upper surface of said receptacle and secured to said receptacle by stress pins extending through said screw and into said metallic receptacle.

* * * * *